United States Patent [19]
Nelkin et al.

[11] 3,723,954
[45] Mar. 27, 1973

[54] REVERBERATION FILTER SYSTEM

[75] Inventors: Arthur Nelkin; John H. Thompson, both of Pittsburgh, Pa.

[73] Assignee: The United States of America as represented by the Secretary of the Navy

[22] Filed: Aug. 24, 1956

[21] Appl. No.: 606,177

[52] U.S. Cl. ................................... 340/3 R, 114/23
[51] Int. Cl. .............................................. G01s 9/66
[58] Field of Search...181/.5, .52, 15; 340/261, 148, 340/3, 3 R, 1 R; 114/23

[56] References Cited

UNITED STATES PATENTS

| | | | |
|---|---|---|---|
| 1,715,831 | 6/1929 | Hahnemann | 181/.5 |
| 2,621,243 | 12/1952 | Sunstein | 340/3 |

*Primary Examiner*—Richard A. Farley
*Attorney*—V. C. Muller, G. J. Rubens and P. H. Firsht

EXEMPLARY CLAIM

1. In a target-detection system carried by a propulsive craft, in combination, means for projecting target search signals, means for receiving resultant target echo signals accompanied by spurious reverberation signals, a reverberation-suppression filter system having a substantially constant attenuation-bandwidth characteristic but adjustable as to effective frequency limits thereof and connected to isolate the target echo signals from said reverberation signals, means constructed and arranged to adjust the frequency limits of said filter system in response to and in accordance with the varying speed of said propulsive craft, and means for utilizing the substantially reverberation-free echo signals.

5 Claims, 2 Drawing Figures

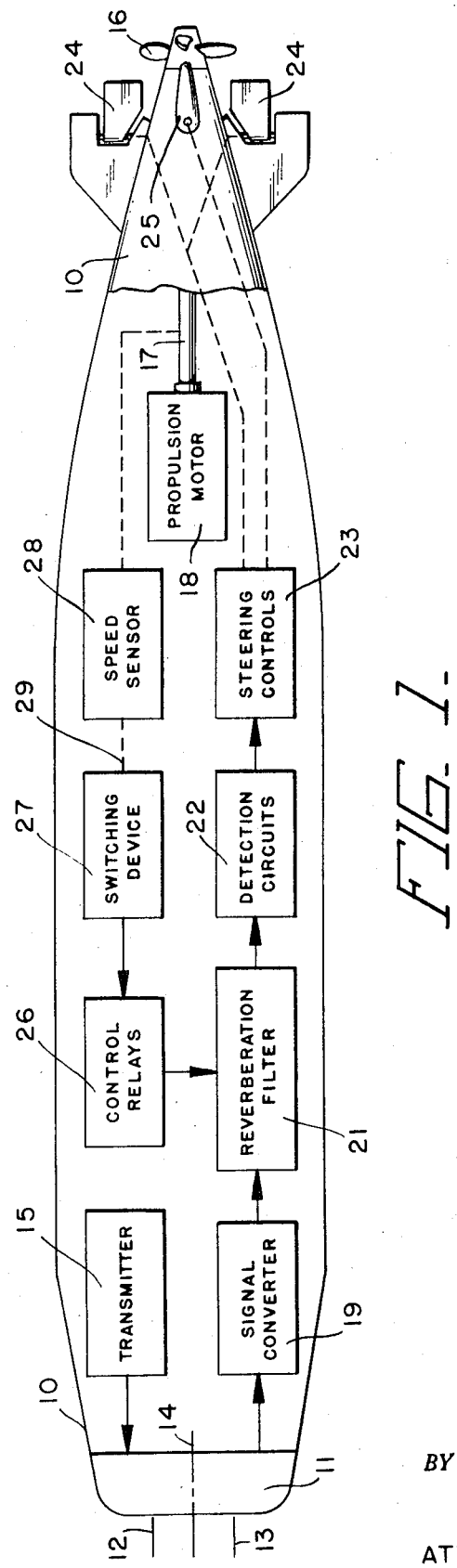

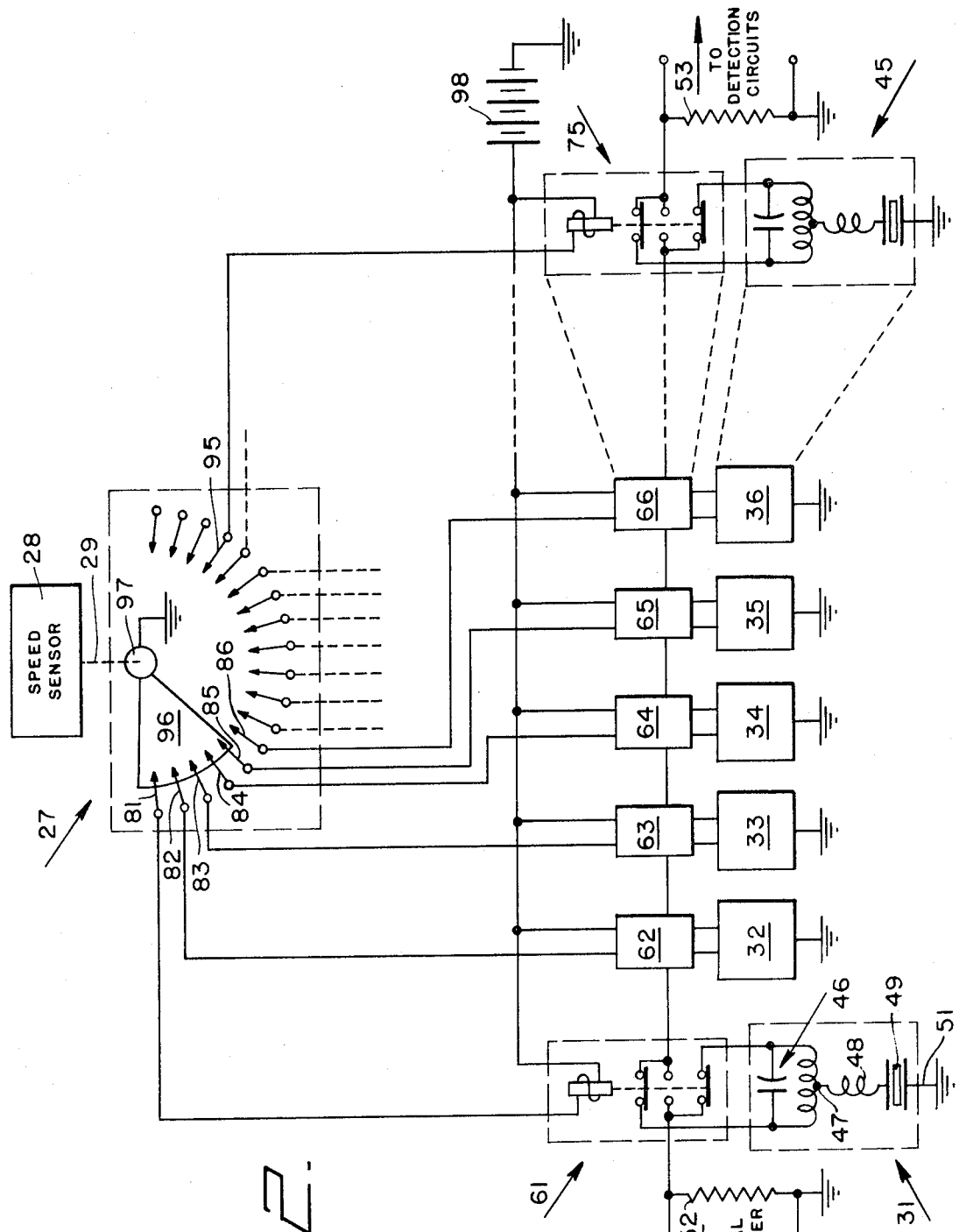

REVERBERATION FILTER SYSTEM

This invention relates generally to underwater electro-acoustic apparatus, and more particularly to underwater electro-acoustic apparatus of the type employing band-suppression filters for attenuation of received reverberation signals.

The invention is of special utility in torpedoes of active-acoustic-homing type, such as disclosed in U.S. Pat. application, Ser. No. 414,525, entitled "Continuous Wave Acoustic Guidance System," filed 5 Mar. 1954 by William H. Hamilton and Arthur Nelkin, now U.S. Pat. No. 3,180,296, and in U.S. Pat. application Ser. No. 581,263, entitled "Target Location System," filed 27 Apr. 1956 by William Altar and Carl W. Helstrom, now U.S. Pat. No. 3,221,695, and is described here in such connection. It should be understood, however, that the invention is fully applicable in principle to any underwater target detection and location equipment, of active-acoustic type, carried by surface or submarine craft or a homing torpedo as the case may be.

In torpedoes of active-acoustic-homing type, the transmission or projection of target search energy, generally at an ultrasonic carrier frequency and either pulsed or unmodulated, gives rise not only to the desired echoes from targets within acoustic range of the torpedo, but also to spurious reverberation signals which tend to mask the target echoes and from which the target echoes must be discriminated to provide effective and undisturbed operation of target detection and location circuits. As now well known, reverberation arises principally from substantially stationary particles, bubbles and other discontinuities in the seawater, the medium in which the ultrasonic energy is propagated. The reverberation signals as received exhibit frequency-spread as later described, but may be referred to as having a nominal or center frequency, differing from the frequency of the ultrasonic energy as generated in the torpedo because of the well-known Doppler effect. The Doppler effect comes into play, of course, because projection of the ultrasonic search energy and reception of resultant signals take place at an electro-acoustic transducer which, being carried by the torpedo, is in motion relative to the seawater medium. Target echoes as received are likewise at a frequency differing from that of the search energy as generated. It should be particularly noted that where the target also is in motion, with a velocity component directed toward or away from the torpedo and thus giving rise to a further Doppler effect, the target echoes differ in frequency from the nominal frequency of reverberation. Electro-acoustic systems of the general type here under discussion may therefore be designed to make use of this frequency difference characteristic as the means for discriminating target echoes from reverberation signals. Reverberation suppression filters are often employed in such systems, as in the manner indicated in the above-mentioned application, in order to permit simplification of target detection and direction-derivation circuits in the torpedo system and to provide improved operation of the said system.

It will be recognized that reverberation as actually received does not occur simply at a discrete frequency, but rather is spread over a band of frequencies, primarily due to the appreciable beam-width of transmission and reception field patterns, and to the differing effective velocities of the transducer as measured along various directions within these field patterns. Reverberation suppression filters must therefore normally be designed to provide attenuation over at least this frequency spread, imposing some limitation as to the lowest target speed at which target echoes will exhibit sufficient departure from reverberation frequency to be detectable, for echoes arising from targets running at lower speeds will have frequencies lying within and therefore masked by the frequency spread of reverberation. The masking problem is further aggravated by the fact that the center reverberation frequency is to a troublesome extent unpredictable unpredictable it is a function of several variable factors, principally torpedo speed. Torpedo speed may vary during a torpedo run, for example because of inconstancy of motor or battery characteristics, and may also vary as between torpedoes because of practical engineering specification tolerances. In a torpedo employing a transducer of limited face area, operating at a frequency of say 60 kc/s (kilocycles per second), and running at a nominal speed of 25 knots but actually at speeds as much as say 2 knots greater and 4 knots less than nominal speed during any given run, reverberation may have a frequency spread of about 100 c/s (cycles per second), and the nominal frequency will be subject to a variation of about 240 c/s, thus amounting to a frequency band of about 340 c/s at which attenuation would normally be provided by the reverberation suppression filter.

It should now be apparent, then, that utilization of a reverberation suppression filter designed to attenuate over the complete reverberation frequency band, including rather wide "dead" bands in order to accommodate torpedo speed variations, disadvantageously limits the tactical conditions under which the homing torpedo can be effective, in the above-mentioned instance preventing the torpedo from detecting and locating targets other than those running at speeds greater than about 5 knots.

It is therefore an object of the present invention to provide an improved target detection and location system.

It is another object of the invention to provide a target detection and location system including a reverberation suppression filter having substantially constant band-width but adjustable as to effective nominal or center frequency thereof.

It is another object of the invention to provide a target detection and location system of active-acoustic type including a reverberation suppression filter which is adjustable as to center frequency thereof in accordance with speed of the craft carrying the said system.

It is another object of the invention to provide a target detection and location system of active acoustic type, including a multi-section reverberation-suppression filter having a constant band-width attenuation characteristic but automatically adjustable as to center frequency thereof in accordance with speed of the craft carrying the said system.

Other and further objects and attendant advantages of the present invention will be readily appreciated as the invention becomes better understood by reference to the following description of an exemplary embodiment, shown in the accompanying drawing, wherein:

FIG. 1 illustrates a torpedo schematically and block diagrams the electro-acoustic equipment carried thereby, including a reverberation filter system in accordance with the present invention; and FIG. 2 illustrates exemplary details of the reverberation filter system and the manner in which it may be made adjustable as to effective center frequency thereof in accordance with torpedo speed.

Referring now to FIG. 1 of the drawing, a typical embodiment of the present invention as employed in connection with an active-acoustic-homing torpedo is here shown largely in schematic block diagram form, wherein torpedo 10 carries an electro-acoustic transducer 11 at its forward end, the transducer having several sections (not shown) which may be used individually, or which may be automatically re-circuited (by means not forming part of the present invention nor required for an understanding thereof) so that they may be used both in transmitting ultrasonic search energy and in receiving resultant signals. The major acoustic axes 12, 13 of the several sections of transducer 11 extend in substantially the same direction as the forward longitudinal axis 14 of torpedo 10. The transmitter equipment 15 which generates ultrasonic energy at a fixed frequency (say 60 kc/s) for target search purposes may be entirely conventional in design. The torpedo is arranged to be self-propulsive by means of propeller unit 16 coupled by shaft assembly 17 to electrical motor 18, the latter being powered by battery means (not shown) which is subject to relatively large variations in terminal voltage under load during a torpedo run, such variation generally proving the principal cause of speed variations as previously indicated.

The receiving equipment may be of the type disclosed in the previously mentioned copending applications, wherein received target echoes (in some instances operated upon by a signal converter 19 to provide an amplitude-modulated signal which carries complete target direction information), and of course the accompanying reverberation signals, are applied to filter system 21 in order to strongly attenuate the reverberation, in this instance in a frequency spectrum having substantially fixed band-width but variable frequency limits dependent upon the actual torpedo speed as will appear. Succeeding operations performed upon the substantially reverberation-free target signals by target detection and location circuits, here shown as grouped in unit 22, provide steering signals which are applied to torpedo steering control unit 23 to position the torpedo's course-steering rudders 24 and depth-steering elevators 25 in a manner to effect target-homing action.

Filter system 21 includes a number of filter sections arranged to be selectively circuited in a predetermined manner, as later detailed with reference to FIG. 2. The circuiting of the filter sections may be accomplished by means of a control relay system 26 under command of a switching device 27 in accordance with torpedo speed as determined by a speed-sensing device 28. Each of the above items, which coact to provide an adjustable center-frequency by effecting suitable circuiting of the filter sections, may take any of several forms. Speed sensor 28, for example, may be a pitot tube device, having an element thereof disposed externally of the torpedo shell to sense relative torpedo speed in terms of a pressure differential, this pressure differential being applied to a Bourdon pressure-tube mechanism adapted to provide a corresponding angular displacement of an output member 29 which is coupled to switching device 27. Such a speed-sensing technique would appear particularly useful for torpedoes which are rendered self-propulsive by means other than shaft-driven propellers. In the particular embodiment here shown, it proves more convenient and practical to sense torpedo speed in terms of the rotational speed of propeller shaft assembly 17, which in practice may drive either a single propeller unit 16 as illustrated, or which may comprise counter-rotating shafts to drive counter-rotating propeller units (not shown). In this instance, then, speed sensor 28 may be geared or otherwise associated with shaft assembly 17, as here indicated schematically, controlled in accordance with the rotational speed of shaft assembly 17 and therefore substantially in accordance with the speed of torpedo 10, and adapted to operate switching device 27 in accordance with the rotational speed of shaft assembly 17. By way of example, there may be employed a simple servo arrangement wherein a relatively small-sized generator is coupled to shaft assembly 17 to produce a voltage corresponding to the rotational speed thereof, a potentiometer device is coupled to output member 29 to provide a potentiometer output voltage corresponding to displacement of output member 29, and a servo-amplifier controls a small servo-motor to force the output member 29 to a position at which the potentiometer output voltage matches the generator voltage. It is to be understood, of course, that many other conventional techniques are available which may be employed to provide the desired control of switching device 27.

Referring now to FIG. 2 which schematically details the switching device, the control relay system and the filter system of FIG. 1, in an arrangement given as an example of how the invention may be implemented to provide reverberation-suppression which is variable as to its center frequency in accordance with torpedo speed, the filter system may comprise a number of sections 31–45, in this instance each having a fixed-tune L-C circuit 46, center-tapped at 47 and connected at that point through series-connected inductor 48 and piezoelectric unit 49 to the reference ground terminal 51 which forms a common return point for both the input and output circuits of the filter sections. Each section thus functions as a relatively sharply tuned bridged-T type of filter having a steep-sided notching or band-rejection characteristic as is desirable in this embodiment. The sections 31–45 are so designed that their rejection bands adjoin as to frequency limits in order to encompass the entire spectrum in which reverberation may occur, referred to again hereinafter. The ohmic values of the resistors 52, 53 connected across the input and output terminals of the filter system are equal to the image impedance of the filter sections and are provided for matching purposes as is well understood. Associated with the filter sections 31–45 are a like number of relays 61–75, each having a set of contacts connected to normally (relay de-energized) take the filter sections completely out of circuit and substitute continuity links therefor, as shown at filter section 45.

During relay energization, these contacts are switched to insert the filter section in series-additive relationship to adjacent circuits in the filter system, as indicated at filter section 31. Switching device 27 may be of rotary type as shown, having stationary finger contacts 81–95 equal in number to the number of relays and to the number of filter sections, and a sector-shaped movable contact plate 96 which is angularly displaceable by means of shaft 97, under control of output member 29, to engage successive finger contacts. Sector-shaped contact plate 96 is of suitable angular width to maintain engagement with a predetermined number of finger contacts while being displaced through an angle corresponding to the spacing between finger contacts, for reasons which will appear. Relays 61–75 are adapted to be energized by voltage source 98 when continuity through their windings is established by means of switching device 27. This may be accomplished by circuit connections such as here shown, wherein contact plate 96 is connected to one terminal of source 98 through shaft 97 and a common ground connection, one terminal of each relay winding is connected to the other terminal of source 98, and the remaining relay winding terminals are connected in the desired relay-operating sequence to finger contacts 81–95.

By way of example, the arrangement shown in FIG. 2 is one of several which would be satisfactory for a typical torpedo system such as previously considered, where the operational characteristics including transmission frequency, nominal speed and expected speed variations would result in reverberation requiring attenuation in say nearly a 100 c/s band within a total frequency spectrum about 340 c/s in bandwidth. In this instance fifteen filter sections may be employed, each having a 24 c/s bandwidth and successive nominal frequencies spaced by like amount, so that a contiguous set of five such filter sections in series connection will provide satisfactory reverberation rejection in each speed change interval which produces a 24 c/s change in reverberation center-frequency, during which speed change the sector-shaped contact plate 96 is uniformly moved, by output member 29 of speed sensor 28, to the next succeeding set of five finger contacts. Switching device 27 is here shown with its contact plate 96 in a position just beyond that corresponding to the minimum torpedo speed, say 21 knots, at which reverberation extends from say 60.764 kc/s to 60.860 kc/s. Since only the first five filter sections 31–35 are in series circuit at this time because only relays 61–65 are energized through finger contacts 81–85, the effective rejection band of the filter system at this time extends from 60.764 kc/s to 60.884 kc/s and is so maintained while contact plate 96 is being moved toward finger contact 86 as the torpedo speed increases by essentially 0.6 knots, thus accommodating the reverberation frequency-spread continuously as its position within the frequency spectrum moves toward the band extending from 60.788 kc/s to 60.884 kc/s. At the instant that the torpedo speed becomes 21.6 knots and contact plate 96 leaves finger contact 81 and engages the next set of finger contacts 82–86, de-energization of relay 61 substitutes a shorting link for filter section 31, and filter sections 32–36 are placed in series circuit, thus changing the rejection band of the filter system to extend from 60.788 kc/s to 60.908 kc/s and therefore still encompassing the reverberation frequency-spread corresponding to the 21.6 knot speed. Further speed increases will result in continuing action of this nature in like manner, and the action reverses of course for decreasing speeds, thus effecting reverberation attenuation at varying torpedo speeds, yet in a frequency band very little greater than that required for reverberation frequency-spread alone.

Various additions to, subtractions from or other modifications of the above-described apparatus will occur to those skilled in the art. For example, an additional set of contacts in each relay can be utilized in such manner as to insure that switching device 27 never places more than the predetermined number of filter sections in circuit at the time of switching from one group to another, although this condition would merely be transient and therefore of no great importance. As another example, it may in some instances be feasible to dispense with the relays and to control circuiting of the filter sections directly by means of a multi-layer, multi-pole switching device in lieu of that shown. Again, other types of filter sections may be utilized, not necessarily employing piezo-electric units. It should also be apparent that while the invention is here illustrated and described with reference to a specific torpedo embodiment, it is also applicable in principle to other types of torpedoes and to target detection and direction finding equipment in general.

Obviously other modifications, variations and applications of the present invention are thus possible in the light of the above teachings. It is therefore to be understood that within the scope of the appended claims the invention may be practiced otherwise than as specifically described herein.

What is claimed is:

1. In a target-detection system carried by a propulsive craft, in combination, means for projecting target search signals, means for receiving resultant target echo signals accompanied by spurious reverberation signals, a reverberation-suppression filter system having a substantially constant attenuation-bandwidth characteristic but adjustable as to effective frequency limits thereof and connected to isolate the target echo signals from said reverberation signals, means constructed and arranged to adjust the frequency limits of said filter system in response to and in accordance with the varying speed of said propulsive craft, and means for utilizing the substantially reverberation-free echo signals.

2. In a target-detection system carried by a propulsive craft, in combination, means for projecting target search signals, means for receiving resultant target echo signals accompanied by spurious reverberation signals, a reverberation-suppression filter system comprising series-connected substantially alike filter sections which adjoin consecutively as to rejection-frequency limits, means for connecting a selected group of said filter sections to isolate the target echo signals from said reverberation signals, and means for utilizing the substantially reverberation-free echo signals.

3. In a target-detection system carried by a propulsive craft, in combination, means for projecting target search signals, means for receiving resultant target echo signals accompanied by spurious reverberation signals, a reverberation-suppression filter system comprising series-connected substantially alike filter sections which adjoin consecutively as to rejection-frequency limits, means constructed and arranged to select a group of said consecutively adjoining filter sections in response to and in accordance with the varying speed of said propulsive craft and connected to isolate the target echo signals from said reverberation signals, and means for utilizing the substantially reverberation-free echo signals.

4. In a target-detection system carried by a propulsive craft, in combination, means for projecting target search signals, means for receiving resultant target echo signals accompanied by spurious reverberation signals, a reverberation-suppression filter system comprising a series of substantially alike filter sections having adjoining rejection-frequency limits, switching means constructed and arranged to connect selected filter sections in circuit to isolate the target echo signals from said reverberation signals, means constructed and arranged to control said switching means in response to and in accordance with the varying speed of said propulsive craft, and means for utilizing the substantially reverberation-free echo signals.

5. In a mobile active-acoustic target-detection system including an electro-acoustic transducer which projects and receives signals in a field pattern extending along a search axis, wherein spurious signals may be received at frequencies varying in accordance with the velocity of said transducer in the direction along said search axis, a filter system comprising a series of substantially alike filter sections having adjoining rejection-frequency limits, switching means constructed and arranged to connect selected filter sections in circuit to attenuate said spurious signals, and switching control means constructed and arranged to control said switching means in response to and in accordance with said transducer velocity.

* * * * *